(12) United States Patent
Chen et al.

(10) Patent No.: US 12,388,830 B2
(45) Date of Patent: Aug. 12, 2025

(54) SECURE CONTAINER USE BASED ON PERMISSION LIMITATION OF IMAGE LAYERS

(71) Applicant: International Business Machines Corporation, Armonk, NY (US)

(72) Inventors: Xiao Ling Chen, Beijing (CN); Si Yu Chen, Beijing (CN); Wen Ji Huang, Beijing (CN); Heng Wang, Beijing (CN); Yan Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 18/339,465

(22) Filed: Jun. 22, 2023

(65) Prior Publication Data

US 2024/0430268 A1    Dec. 26, 2024

(51) Int. Cl.
*H04L 9/40*        (2022.01)
(52) U.S. Cl.
CPC .......... *H04L 63/104* (2013.01); *H04L 63/101* (2013.01)
(58) Field of Classification Search
CPC ........................... H04L 63/104; H04L 63/101
See application file for complete search history.

(56) References Cited

U.S. PATENT DOCUMENTS

| | | | | |
|---|---|---|---|---|
| 9,443,112 | B2 * | 9/2016 | Kurian | G06F 21/78 |
| 10,142,370 | B2 * | 11/2018 | Goyal | G06F 21/577 |
| 10,447,737 | B2 * | 10/2019 | Hua | H04L 63/102 |
| 2016/0294881 | A1 * | 10/2016 | Hua | H04L 63/20 |
| 2017/0098071 | A1 * | 4/2017 | Stopel | G06F 21/554 |
| 2021/0097190 | A1 * | 4/2021 | Scrivano | G06F 21/6218 |
| 2022/0255966 | A1 * | 8/2022 | Sienicki | H04L 63/123 |
| 2024/0364696 | A1 | 10/2024 | Huang et al. | |

FOREIGN PATENT DOCUMENTS

| | | |
|---|---|---|
| CN | 110647580 B | 6/2022 |
| WO | 2018007213 A1 | 1/2018 |

OTHER PUBLICATIONS

Han et al., "Container Image Access Control Architecture to Protect Applications," IEEE Access, 2016, vol. 4, 11 pages.
Reeves, et al., "Towards Improving Container Security by Preventing Runtime Escapes," 2021, IEEE Secure Development Conference (SecDev), Atlanta, GA, USA, 2021, 9 pages.

* cited by examiner

*Primary Examiner* — J. Brant Murphy
(74) *Attorney, Agent, or Firm* — Yee & Associates, P.C.

(57) ABSTRACT

Secure container use is provided. The method generates respective user group permission identifications associated with image layer staging operations permissions assigned to different user groups as well as a list of the user group permission identifications. Responsive to a request from a user to perform an image layer staging operation, the method verifies whether the user has a user group permission identification in the list of the user group permission identifications. Responsive to verification that the user has a user group permission identification in the list of the user group permission identifications, the requested operation is executed. Responsive to determination that the user does not have a user group permission identification in the list of the user group permission identifications, the requested operation is denied.

20 Claims, 9 Drawing Sheets

| | PULL IMAGE | RUN CONTAINER | BUILD IMAGE | PUSH IMAGE |
|---|---|---|---|---|
| EXTERNAL USER | 0 | 0 | 0 | 0 |
| NORMAL USER | 1 | 1 | 0 | 0 |
| LIMITED USER | 1 | 1 | 1 | 0 |
| SUPER USER | 1 | 1 | 1 | 1 |

FIG. 4

400 — LAYER STAGING PERMISSION TABLE

402 — EXTERNAL USER
404 — NORMAL USER
406 — LIMITED USER
408 — SUPER USER

PERMISSION OF PULL IMAGE
PERMISSION OF RUN CONTAINER
PERMISSION OF BUILD IMAGE
PERMISSION OF PUSH IMAGE

SECURE CONTAINER USE BASED ON PERMISSION LIMITATION OF IMAGE LAYERS

BACKGROUND

The present disclosure relates generally to an improved computing system, and more specifically to identifying anomalies in artificial neural networks.

Containers are lightweight, standalone executable units that encapsulate applications and their dependencies such as libraries and runtime environments. Containers have their own file systems, network interfaces, and process space to ensure applications running within them do not interfere with each other or a host system. By encapsulating an entire application stack into a portable unit, containerization ensures consistent deployment of applications across different environments. Creating a container starts with an image, which serves as a blueprint for creating the container. Container images are composed of multiple layers, each layer representing a specific set of changes or additions to the underlying file system. Each step in the image build process creates a new layer, thereby providing a mechanism for incremental changes to the container.

SUMMARY

According to one illustrative embodiment a computer-implemented method secures container use. The method generates respective user group permission identifications associated with image layer staging operations permissions assigned to different user groups as well as a list of the user group permission identifications. Responsive to a request from a user to perform an image layer staging operation, the method verifies whether the user has a user group permission identification in the list of the user group permission identifications. Responsive to verification that the user has a user group permission identification in the list of the user group permission identifications, the requested image layer staging operation is executed. Responsive to determination that the user does not have a user group permission identification in the list of the user group permission identifications, the requested image layer staging operation is denied. According to other illustrative embodiments, a computer system, and a computer program product for secure container use are provided. As a result, the illustrative embodiments provide the technical effect of preventing unauthorized changes to a container image layer.

The illustrative embodiments can permissively record the image layer staging operations permissions assigned to the different user groups and store respective settings of the image layer staging operation permissions. The image layer staging operations permissions are stored in a layer staging permission table generated with a declaration defined by a user who pushes an image to a repository. As a result, the illustrative embodiments provide the technical effect of enabling security control by a user with administrative authority.

The illustrative embodiments can permissively, responsive to a determining that there is a user group permission setting on an image layer, read a layer staging permission setting defined by a user; generate a layer staging permission table; calculate a layer staging permission identification; create a layer staging permission identification list; store the layer staging permission identification list in metadata of the image layer; and push an updated image to a repository. As a result, the illustrative embodiments provide the technical effect of generating a list of user group permission identifications.

The illustrative embodiments can permissively receive the request from the user to perform the image layer staging operation; read metadata of an image layer; responsive to a determination there is a layer staging permission identification list, read an image identification of the image layer; construct an image staging operation code corresponding to the image layer staging operation requested by the user; parse a user group permission assigned to the user regarding layer staging; calculate a user group permission identification according to the image identification, image operation code, and user group permission; and search a layer staging permission identification list for the user group permission identification. As a result, the illustrative embodiments provide the technical effect of verifying whether a user has a user group permission identification.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 depicts a Layer Stating Permission Table in accordance with an illustrative embodiment;

DETAILED DESCRIPTION

Figure 1:
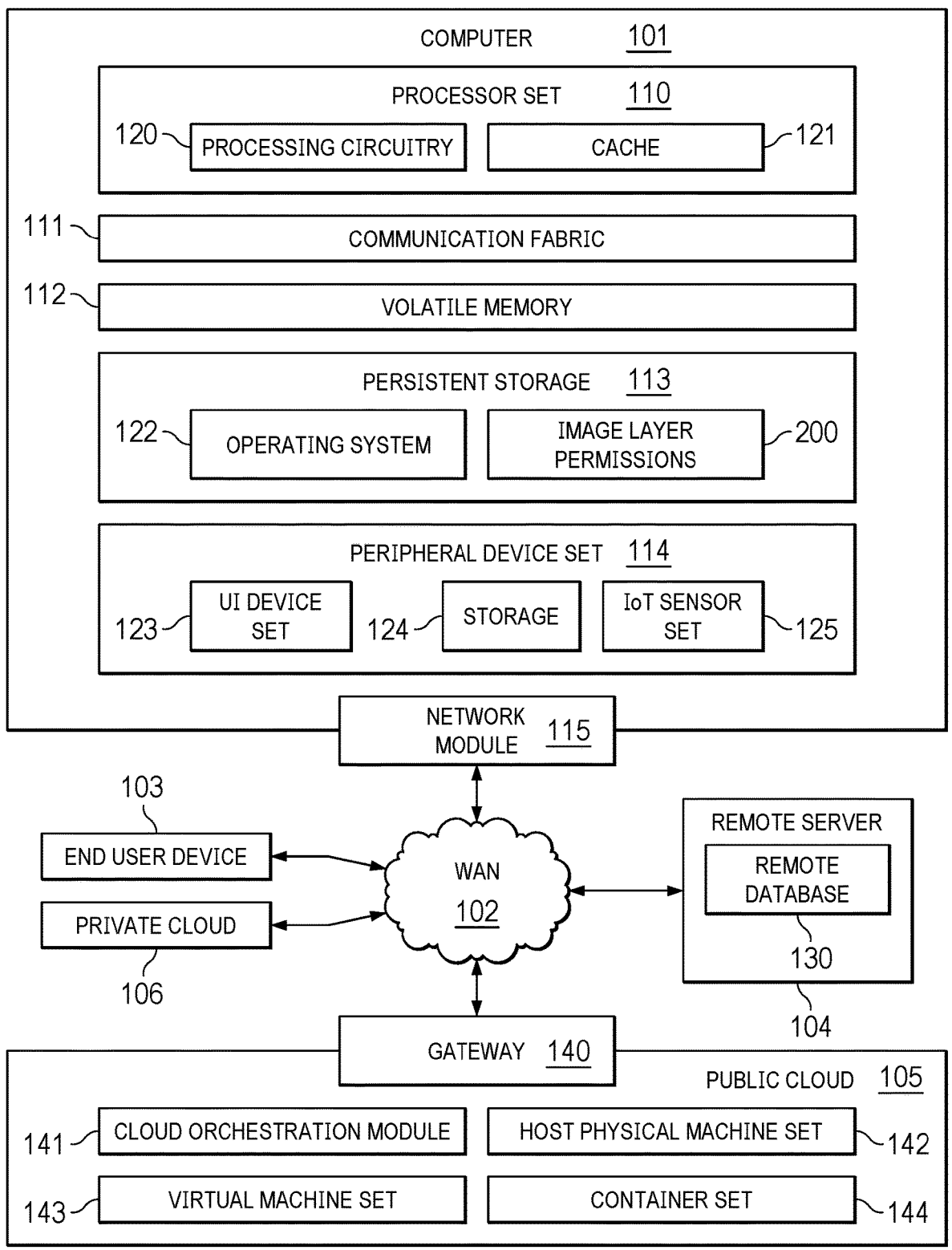
FIG. 1 depicts a pictorial representation of a computing environment in which illustrative embodiments may be implemented.

According to one illustrative embodiment a computer-implemented method secures container use. The method generates respective user group permission identifications associated with image layer staging operations permissions assigned to different user groups as well as a list of the user group permission identifications. Responsive to a request from a user to perform an image layer staging operation, the method verifies whether the user has a user group permission identification in the list of the user group permission identifications. Responsive to verification that the user has a user group permission identification in the list of the user group permission identifications, the requested image layer staging operation is executed. Responsive to determination that the user does not have a user group permission identification in the list of the user group permission identifications, the requested image layer staging operation is denied. According to other illustrative embodiments, a computer system, and a computer program product for secure container use are provided. As a result, the illustrative embodiments provide the technical effect of preventing unauthorized changes to a container image layer.

The image layer staging operations comprise at least one of pull image, run container, build image, or push image. As a result, the illustrative embodiments provide the technical effect of securing used standard image layer operations.

The illustrative embodiments can permissively record the image layer staging operations permissions assigned to the different user groups and store respective settings of the image layer staging operation permissions. The image layer staging operations permissions are stored in a layer staging permission table generated with a declaration defined by a user who pushes an image to a repository. As a result, the illustrative embodiments provide the technical effect of enabling security control by a user with administrative authority.

As part of verifying whether the user has a user group permission identification in the list of the user group permission identifications the verification is performed by a layer staging permission assumer module in a docker daemon engine. As a result, the illustrative embodiments provide the technical effect of running the verification in the docker daemon.

The illustrative embodiments can permissively, responsive to a determining that there is a user group permission setting on an image layer, read a layer staging permission setting defined by a user; generate a layer staging permission table; calculate a layer staging permission identification; create a layer staging permission identification list; store the layer staging permission identification list in metadata of the image layer; and push an updated image to a repository. As a result, the illustrative embodiments provide the technical effect of generating a list of user group permission identifications.

The illustrative embodiments can permissively receive the request from the user to perform the image layer staging operation; read metadata of an image layer; responsive to a determination there is a layer staging permission identification list, read an image identification of the image layer; construct an image staging operation code corresponding to the image layer staging operation requested by the user; parse a user group permission assigned to the user regarding layer staging; calculate a user group permission identification according to the image identification, image operation code, and user group permission; and search a layer staging permission identification list for the user group permission identification. As a result, the illustrative embodiments provide the technical effect of verifying whether a user has a user group permission identification.

A computer system comprises a storage device that stores program instructions and one or more processors operably connected to the storage device and configured to execute the program instructions to cause the system to generate respective user group permission identifications associated with image layer staging operations permissions assigned to different user groups; generate a list of user group permission identifications assigned to different user groups; responsive to a request from a user to perform an image layer staging operation, verify whether the user has a user group permission identification in the list of the user group permission identifications; responsive to verification that the user has a user group permission identification in the list of the user group permission identifications, execute the requested image layer staging operation; and responsive to determination that the user does not have a user group permission identification in the list of the user group permission identifications, deny the requested image layer staging operation. As a result, the illustrative embodiments provide the technical effect of preventing unauthorized changes to a container image layer.

The image layer staging operations comprise at least one of pull image, run container, build image, or push image. As a result, the illustrative embodiments provide the technical effect of securing used standard image layer operations.

The one or more processors further execute program instructions to record the image layer staging operations permissions assigned to the different user groups and store respective settings of the image layer staging operation permissions. The image layer staging operations permissions are stored in a layer staging permission table generated with a declaration defined by a user who pushes an image to a repository. As a result, the illustrative embodiments provide the technical effect of enabling security control by a user with administrative authority.

As part of verifying whether the user has a user group permission identification in the list of the user group permission identifications the verification is performed by a layer staging permission assumer module in a docker daemon engine. As a result, the illustrative embodiments provide the technical effect of running the verification in the docker daemon.

The one or more processors further execute program instructions to, responsive to a determining that there is a user group permission setting on an image layer, read a layer staging permission setting defined by a user; generate a layer staging permission table; calculate a layer staging permission identification; create a layer staging permission identification list; store the layer staging permission identification list in metadata of the image layer; and push an updated image to a repository. As a result, the illustrative embodiments provide the technical effect of generating a list of user group permission identifications.

The one or more processors further execute program instructions to receive the request from the user to perform the image layer staging operation; read metadata of an image layer; responsive to a determination there is a layer staging permission identification list, read an image identification of the image layer; construct an image staging operation code corresponding to the image layer staging operation requested by the user; parse a user group permission assigned to the user regarding layer staging; calculate a user group permission identification according to the image identification, image operation code, and user group permission; and search a layer staging permission identification list for the user group permission identification. As a result, the illustrative embodiments provide the technical effect of verifying whether a user has a user group permission identification.

A computer program product for secure container use, the computer program product comprises a persistent storage medium having program instructions configured to cause one or more processors to generate respective user group permission identifications associated with image layer staging operations permissions assigned to different user groups; generate a list of the user group permission identifications; responsive to a request from a user to perform an image layer staging operation, verify whether the user has a user group permission identification in the list of the user group permission identifications; responsive to verification that the user has a user group permission identification in the list of the user group permission identifications, execute the requested image layer staging operation; and responsive to determination that the user does not have a user group permission identification in the list of the user group permission identifications, deny the requested image layer staging operation.

The image layer staging operations comprise at least one of pull image, run container, build image, or push image. As a result, the illustrative embodiments provide the technical effect of securing used standard image layer operations.

The instructions further cause the processors to record the image layer staging operations permissions assigned to the different user groups and store respective settings of the image layer staging operation permissions. The image layer staging operations permissions are stored in a layer staging permission table generated with a declaration defined by a user who pushes an image to a repository. As a result, the illustrative embodiments provide the technical effect of enabling security control by a user with administrative authority.

As part of verifying whether the user has a user group permission identification in the list of the user group permission identifications the verification is performed by a layer staging permission assumer module in a docker daemon engine. As a result, the illustrative embodiments provide the technical effect of running the verification in the docker daemon.

The instructions further cause the processors to, responsive to a determining that there is a user group permission setting on an image layer, read a layer staging permission setting defined by a user; generate a layer staging permission table; calculate a layer staging permission identification; create a layer staging permission identification list; store the layer staging permission identification list in metadata of the image layer; and push an updated image to a repository. As a result, the illustrative embodiments provide the technical effect of generating a list of user group permission identifications.

The instructions further cause the processors to receive the request from the user to perform the image layer staging operation; read metadata of an image layer; responsive to a determination there is a layer staging permission identification list, read an image identification of the image layer; construct an image staging operation code corresponding to the image layer staging operation requested by the user; parse a user group permission assigned to the user regarding layer staging; calculate a user group permission identification according to the image identification, image operation code, and user group permission; and search a layer staging permission identification list for the user group permission identification. As a result, the illustrative embodiments provide the technical effect of verifying whether a user has a user group permission identification.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as image layer permissions 200. In addition to image layer permissions 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and image layer permissions 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in image layer permissions 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. image layer permissions instructions included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that the are some special containers that are provided and serviced by a producer and service important roles in customers' environments. As a result, these containers must always be available and must not be modified or extended in an unauthorized manner that can lead to unpredictable results and result in related functions no longer being used properly or serviced.

The illustrative embodiments also recognize and take into account that the new image can be built with the same repository and tag once the special container stops. When the container starts again, it will start from the new image instead of the original image. As a result, the newly started container is modified or extended in an unauthorized manner.

The illustrative embodiments also recognize and take into account that Docker Content Trust (DCT) provides the ability to use digital signatures for data sent to and received from remote Docker registries. These signatures allow client-side or runtime verification of the integrity and publisher of specific image tags. However, DCT cannot resolve the issue at hand since the new image can be built and started on a local environment without pushing or committing it to repository.

The illustrative embodiments also recognize and take into account that an authorization plugin approves or denies requests to the Docker daemon based on both the current authentication context and the command context. The authentication context contains all user details and the authentication method. The command context contains all the relevant request data. However, it is difficult and complex to create an effective and full access policy for each image. This process relies on the personal experience of the plugin developer and the Docker administrator. For users at the enterprise level it is an increasing effort to create and design such plugins for all images. This problem is particularly prominent in large-scale projects The illustrative embodiments provide a method to make container exploitation in large-scale projects more secure and flexible while preventing started containers from being modified or extended in an unauthorized manner. A Layer Staging Permission Table (LSPT), and a layer metadata field, Layer Staging Permission ID (LSPID), store all settings of a user group's layer staging operation permission. A Layer Staging Permission Producer (LSPP) module generates a LSPID list. A Layer Staging Permission Assumer (LSPA) determines whether a user has permission to execute an image staging operation by searching LSPID list with a user group permission ID.

The approach of the illustrative embodiments not only makes the container exploitation in large-scale projects more secure and flexible but also saves users' effort to do the layer staging permission definition and management. The target is the image layer which makes the Layer Staging Permission control more granular. In addition, it is extensible for the users to flexibly customize their own different image staging permission and user groups.

Figure 2:
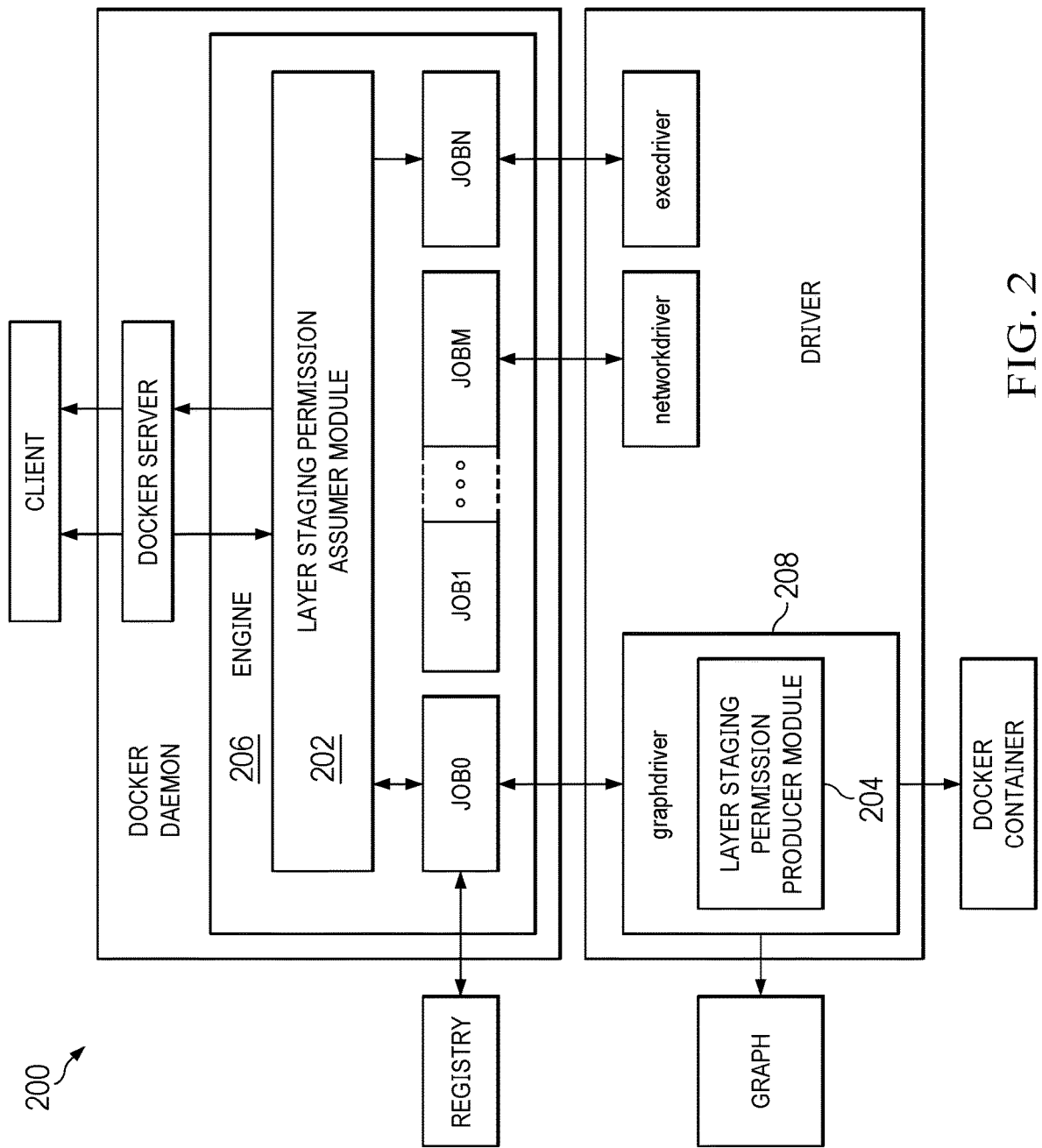
FIG. 2 depicts a block diagram for a container deployment system in accordance with an illustrative embodiment.

FIG. 2 depicts a block diagram for container deployment system in accordance with an illustrative embodiment. Container deployment system 200 can be implemented in computing environment 100 in FIG. 1.

Container deployment system 200 uses a Layer Staging Permission Table (LSPT) to record permissions assigned to different user groups for individual image layer staging operations. Examples of such operations include Pull Image, Run Container, Build Image, Push Image, and others. The LSPT is generated by a Layer Staging Permission Producer (LSPP) module 204 with a declaration defined by the user who pushes the image to the repository (see FIG. 3). The LSPT may be stored in cache, memory, or in a file.

Another attribute used in container deployment system 200 is a Layer Staging Permission ID (LSPID), which records the setting of a user group's layer staging operation permissions. A layer metadata field, LSPID list, stores all settings of the user group's layer staging operation permission (see FIG. 6).

The LSPP module 204 is located in the graph driver 208. Graph driver 208 manages the storage and organization of container images and the underlying file system on the host system that containers use. Graph driver 208 is responsible for managing image layers, container volumes, and container metadata. The LSPP module 204 generates the LSPID and LSPID list. The LSPID list is created automatically and stored in the metadata of the image layer when the LSPT is created and updated.

A Layer Staging Permission Assumer (LSPA) Module 202 located in docker engine 206. Docker engine 206 provides an interface for building, running, and managing containers across different operating systems and environments. The LSPA module 202 determines whether a user has permission to execute an image staging operation. The LSPA module 202 searches the LSPID list with a user group permission ID. The user group permission ID is calculated with an image ID, a user group permission, and an image staging operation code.

Figure 3:
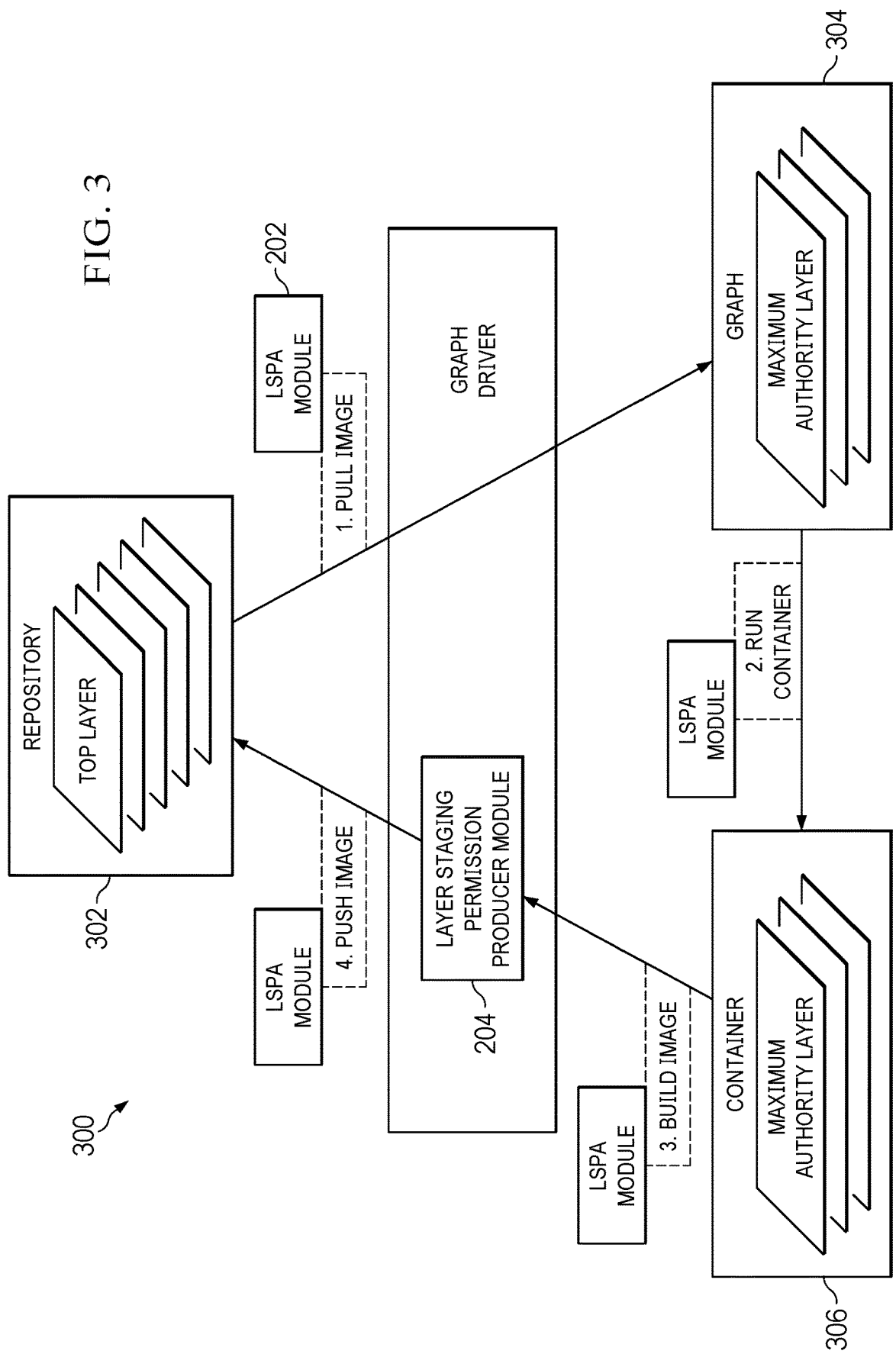
FIG. 3 depicts the operation of a container deployment architecture in accordance with an illustrative embodiment.

FIG. 3 depicts the operation of a container deployment architecture 300 in accordance with an illustrative embodiment. FIG. 3 illustrates how the LSPA module 202 and LSPP 204 module interact with different image staging operations requested by a user.

When Graph 304 a user submits a Pull image to pull an image from a repository 302 to a local machine, LSPA module 202 verifies that the user has a user group permission ID (generated and maintained by the LSPP module 204) authorizing the Pull image staging operation. Similarly, when the user requests a run container staging operation for container 306, LSPA module 202 verifies that the user has permission to do so, as well as when the user request a Build image staging operation and a push image staging operation to push the updated image to the repository 302.

FIG. 4 depicts a Layer Stating Permission Table (LSPT) in accordance with an illustrative embodiment. LSPT 400 records the permissions assigned to different user groups for different image staging operations. The LSPT 400 is generated with a declaration defined by a user who pushed the image to the repository (see FIG. 3). For example, the declaration might be a configuration file. A super user can modify the LSPT 400 of any image layer without creating a new layer for flexible layer permission management.

In LSPT 400, 1 indicates that a user group has permission for a particular operation, 0 indicates that a user group does not have permission for that operation. In the present example, an external user group 402 only has permission to access the container but does not have permission to make any image layer staging operations. A normal user group 404 has permission for pulling an image and running a container but cannot build an image or push an image to the repository. A limited user group 406 has permission for pulling an image, running a container, and building an image but cannot push an image to the repository. A super user group 408 has permission to request all image layer staging operations.

Different permissions or user groups can be defined or configured for different projects or services. The LSPT 400 can be assigned to all image layers or to specific image layers.

Figure 5:
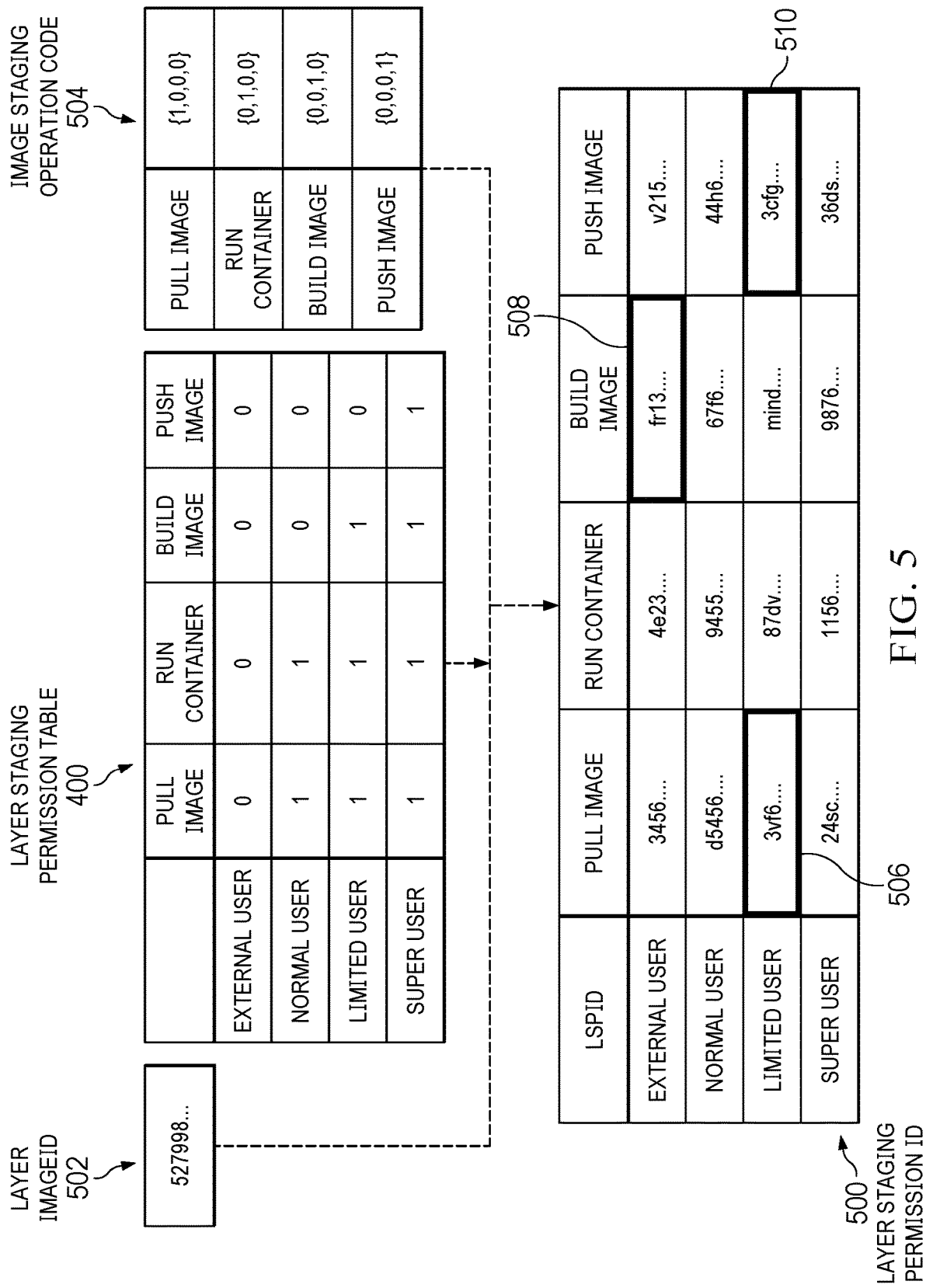
FIG. 5 depicts a process of generating Layer Staging Permission ID in accordance with an illustrative embodiment.

FIG. 5 depicts a process of generating Layer Staging Permission ID (LSPID) in accordance with an illustrative embodiment. The LSPID records a user group's image layer staging operation permission.

The Layer Stage Permission Producer (LSPP) module 204 of the graph driver 208 generates the PSPID 500. The LSPID 500 for each user group is generated by a hash function that combines a layer imageID 502, user group permissions in the LSPT 400, and an image staging operation code (ISOC) 504. ISOC 504 provides a code for the different image layer staging operations. For example: Pull image {1,0,0,0}, Run container {0,1,0,0,}, Build image {0,0,1,0}, Push image {0,0,0,1}.

An example of an LSPID is the LSPID 506 for image pulling for a Limited User Group, which is calculated:

$$LSPID = \text{HASH}\ (527998 \ldots + 1 + \{1, 0, 0, 0\}) = (3Vf6 \ldots )$$

Another example is LSPID 508 for image building for an External User Group, which is calculated:

$$LSPID = \text{HASH}\ (527998 \ldots + 0 + \{0, 0, 1, 0\}) = fr13 \ldots$$

As explained above, the Layer Staging Permission Assumer (LSPA) module 202 located in the Docker engine 206 determines whether the user has permission to execute an image staging operation. The LSPA module retrieves a user's user group permission and calculates a user group permission ID as a hash function of the image layer ID, user group permission ID, and ISOC. For example, the user group permission ID for image pushing for a Limited User Group is calculated:

$$UserGroupPermissionID = \text{Hash } (527998 \ldots + 0 + \{0, 0, 0, 1\}) = 3cfg \ldots$$

Figure 9:
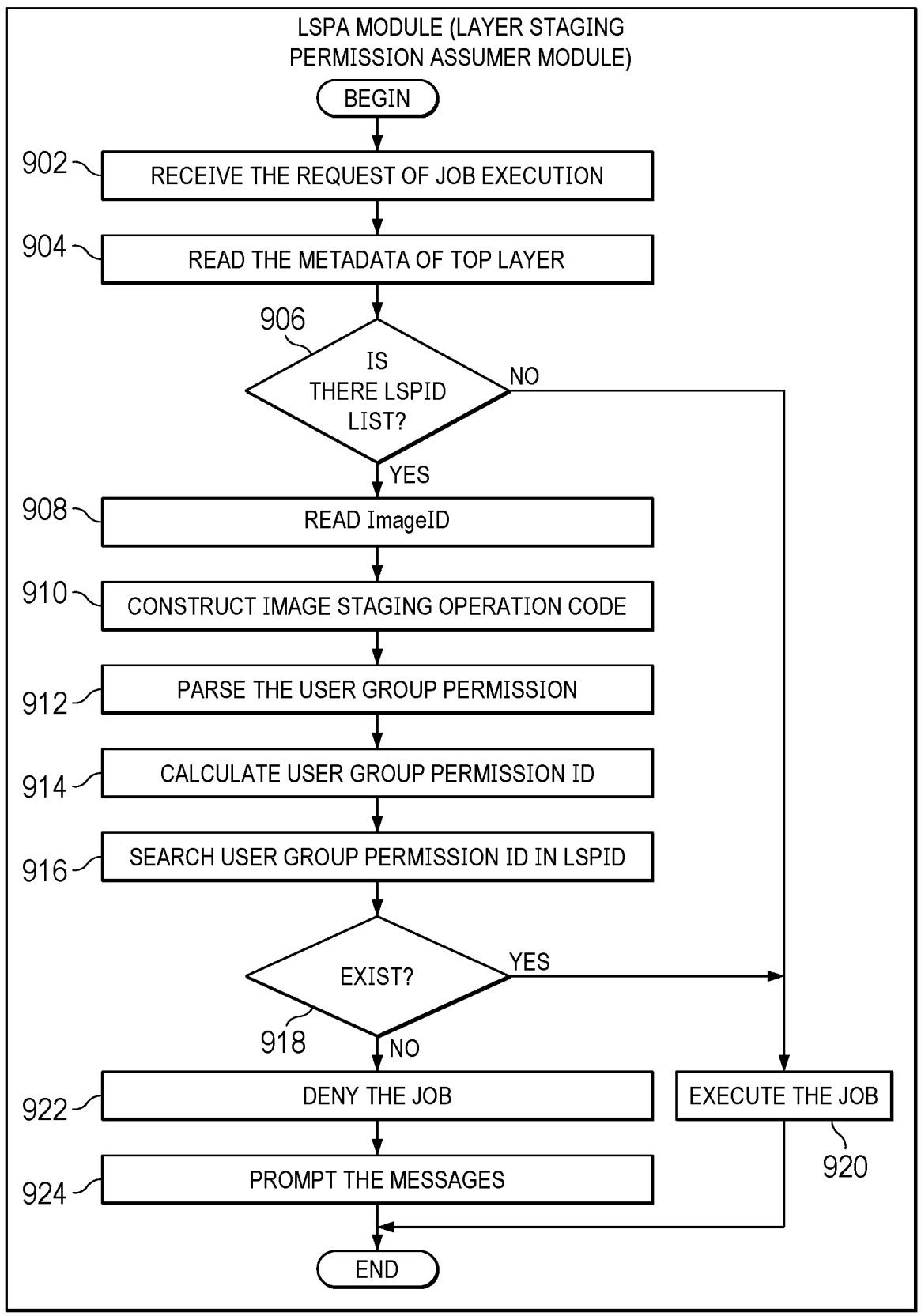
FIG. 9 depicts a flowchart of a process for verifying whether a user has a user group permission identification in the list in accordance with an illustrative embodiment.

The LSPA module searches the LSPID list with UserGroupPermissionID (3cfg . . . ) and executes or denies the requested image layer staging operation depending on whether the user group permission ID is in the LSPID list (see FIG. 9).

Figure 6:
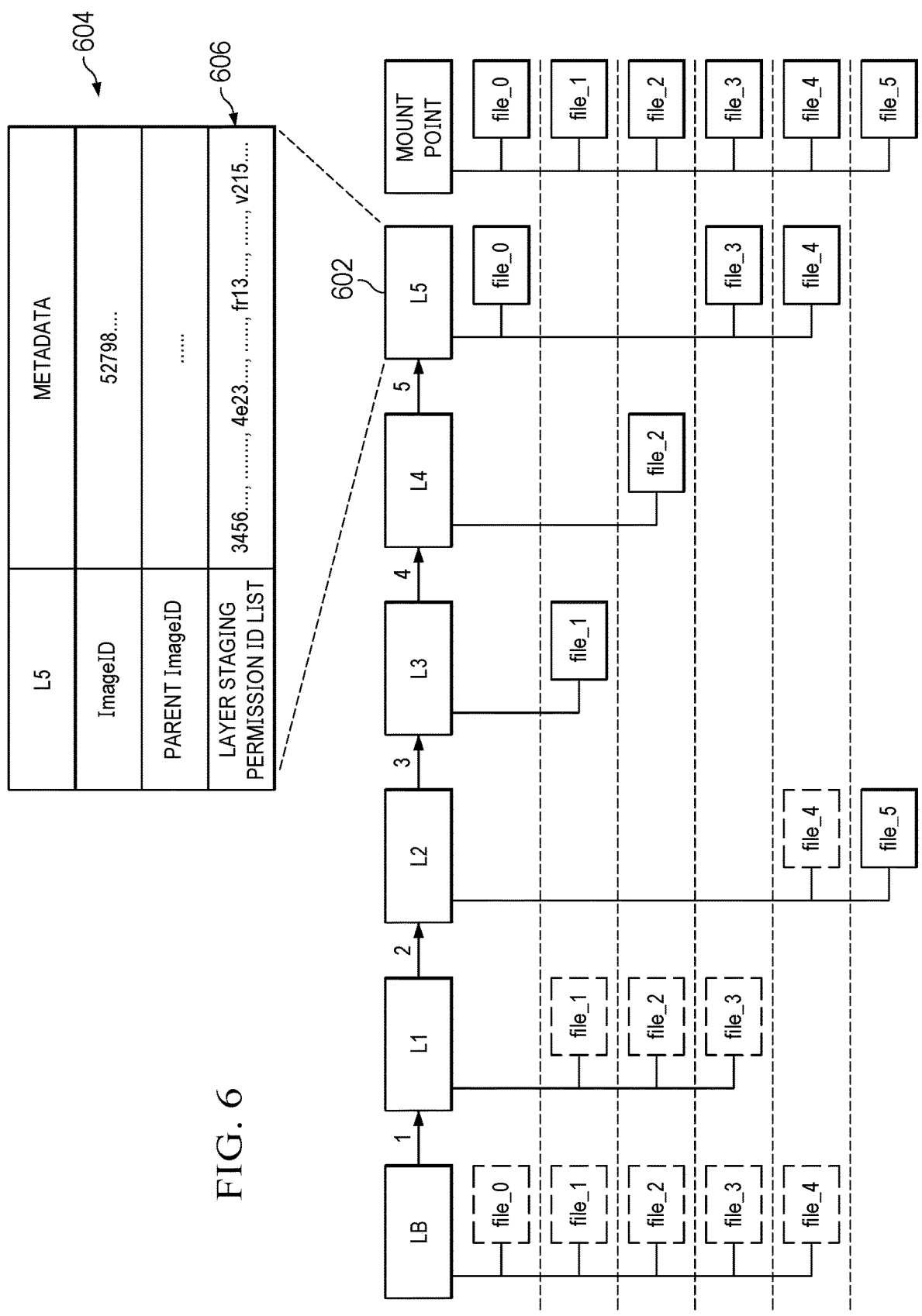
FIG. 6 depicts a Layer Staging Permission ID list in layer metadata in accordance with an illustrative embodiment.

FIG. 6 depicts a Layer Staging Permission ID (LSPID) list in image layer metadata in accordance with an illustrative embodiment. The LSPID list 606 is generated by LSPP module 204 of the graph driver 208 and stores all settings of a user group's layer stating operation permission. LSPID list 606 is included as a field in the metadata 604 of an image layer 602. In the present example, the image layer in question is a top layer L5 in the container image.

An LSPID (e.g., 506) is an element in the LSPID list 606. The LSPID list 606 is created automatically and stored in the metadata 604 on the image layer 602 when a Layer Staging Permission Table (LSPT) 400 is created and updated.

Figure 7:
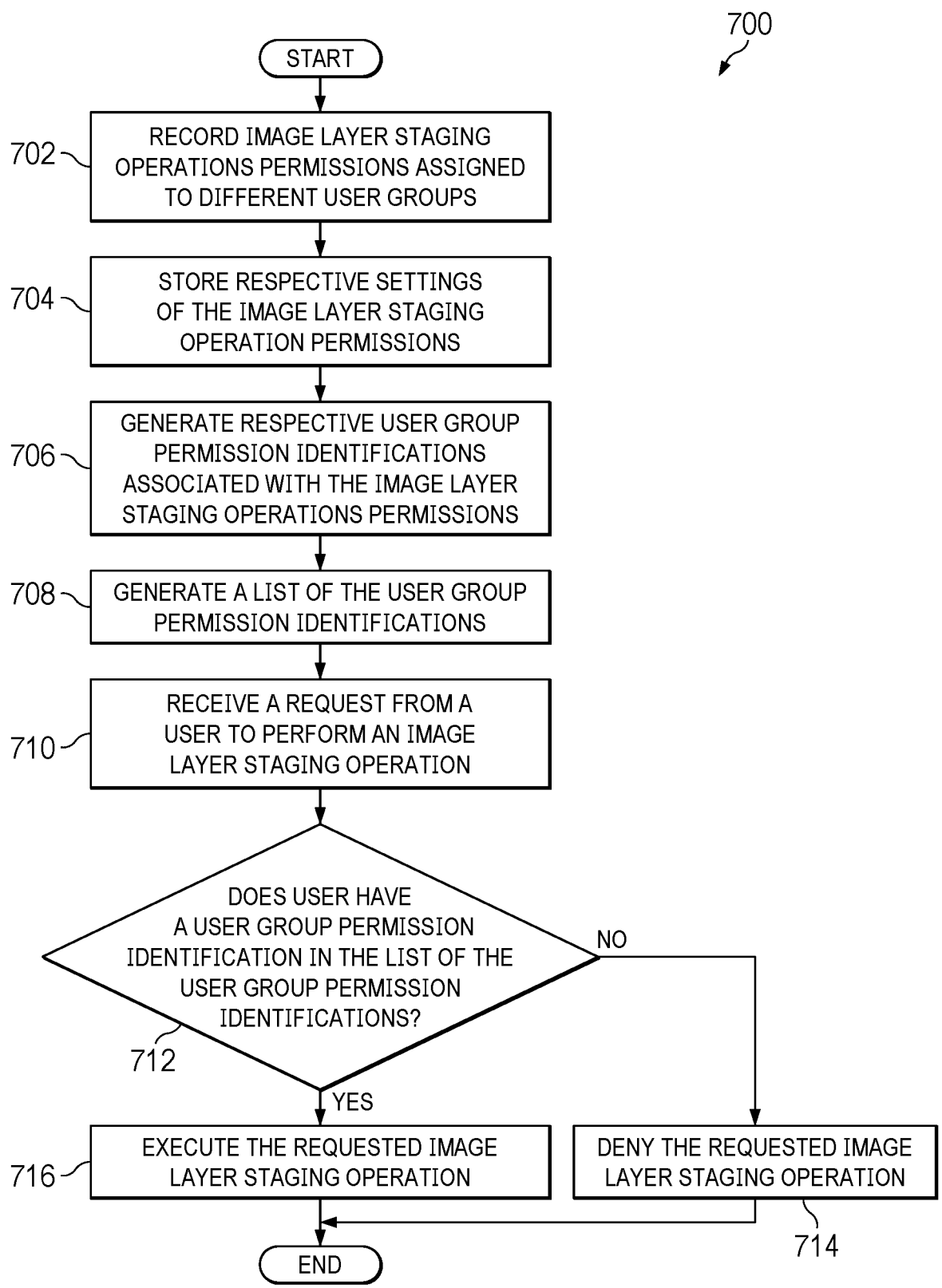
FIG. 7 depicts a flowchart of a process for secure container use in accordance with an illustrative embodiment.

FIG. 7 depicts a flowchart of a process for secure container use in accordance with an illustrative embodiment. Process 700 can be in computing environment 100 in FIG. 1.

Process 700 begins by recording image layer staging operations permissions assigned to different user groups (step 702). The image layer staging operations might comprise at least one of pull image, run container, build image, or push image.

Process 700 stores respective settings of the image layer staging operation permissions (step 704). The image layer staging operations permissions may be stored in a layer staging permission table generated with a declaration defined by a user who pushes an image to a repository.

Process 700 generates respective user group permission identifications associated with the image layer staging operations permissions (step 706) and generates a list of the user group permission identifications (step 708). Generating the list of the user group permission identifications can be performed by a layer staging permission producer module in a graph driver.

Responsive to a request from a user to perform an image layer staging operation (step 710), process 700 verifies whether the user has a user group permission identification in the list of the user group permission identifications (step 712). Verifying whether the user has a user group permission identification in the list of the user group permission identifications can be performed by a layer staging permission assumer module in a docker daemon engine.

Responsive to determination that the user does not have a user group permission identification in the list of the user group permission identifications, process 700 denies the requested image layer staging operation (step 714). Responsive to verification that the user has a user group permission identification in the list of the user group permission identifications, process 700 executes the requested image layer staging operation (step 716). Process 700 then ends.

Figure 8:
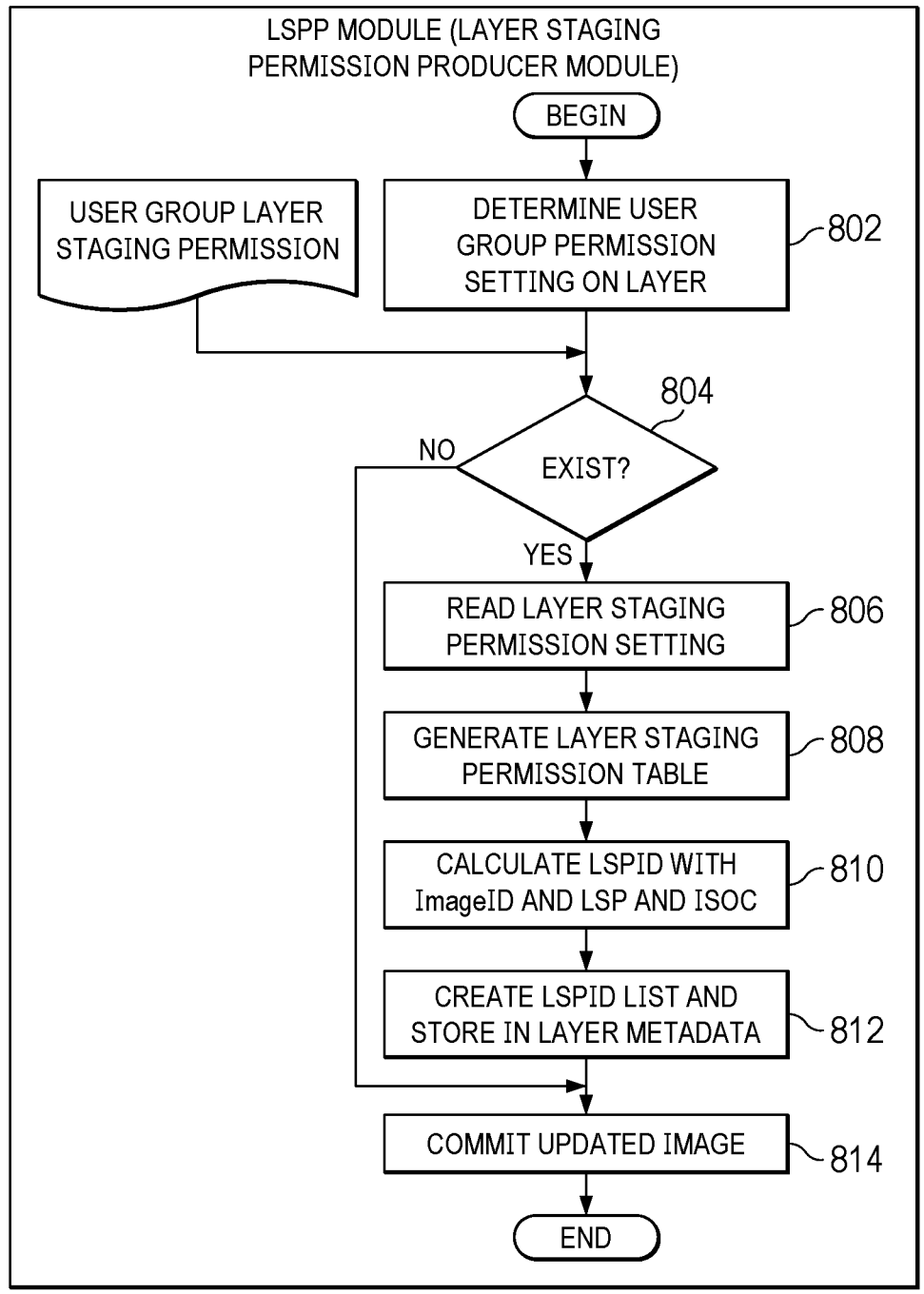
FIG. 8 depicts a flowchart of a process for generating a list of the user group permission identifications in accordance with an illustrative embodiment.

FIG. 8 depicts a flowchart of a process for generating a list of the user group permission identifications in accordance with an illustrative embodiment. Process 800 is a detailed example of step 708 in FIG. 7.

Process 800 begins by determining whether there is a user group permission setting on the image layer (step 802). There is no user group permission setting, process 800 proceeds to committing (pushing) the updated image to a repository (step 814).

Responsive to a determining that there is a user group permission setting on an image layer (step 804), process 800 reads the layer staging permission setting defined by a user (step 806) and generating a layer staging permission table (step 808).

Process 800 then calculates a layer staging permission identification (i.e., Layer Staging Permission ID=HASH (ImageID+Layer Staging Permission (LSP)+Image Staging Operation Code (ISOC))) (step 810). Process 800 creating a layer staging permission identification list (LSPID list) and stores the layer staging permission identification list in metadata of the image layer (step 812).

Process 800 pushes the updated image to the repository (step 814). Process 800 then ends.

FIG. 9 depicts a flowchart of a process for verifying whether a user has a user group permission identification in the list in accordance with an illustrative embodiment. Process 900 is a detailed example of steps 712-714 in FIG. 7.

Process 900 begins by receiving the request from the user to perform the image layer staging operation (step 902). The request might be for, e.g., pull image, run container, build image, push image, etc.

Process 900 reads the metadata of the image layer (step 904) and determines whether there is a layer staging permission identification (LSPID) list (step 906). If there is no LSPID list, process 900 executes the requested job (step 920).

Responsive to a determination there is a layer staging permission identification list, process 900 reads an image identification of the target top layer (step 908) and constructs an image staging operation code corresponding to the image layer staging operation requested by the user (i.e., {0,0,0,1} for push image) (step 910).

Process 900 parses the user group permission assigned to the user regarding layer staging (e.g., the permission of push image for Limited User is 0) (step 912). Process 900 then calculates the user group permission identification according to the image identification, image operation code, and user group permission (step 914).

Process 900 searches the layer staging permission identification list for the user group permission identification (step 916) and determines whether the user group permission identification is included in the layer staging permission identification list (step 918).

Responsive to a determination that the user group permission identification is included in the layer staging permission identification list, process 900 executes the requested image layer staging operation (step 920). Responsive to determination that the user group permission identification is not included in the layer staging permission identification list, process 900 denies the requested job (step 922) and prompts the user with messages about the job denial (step 924). Process 900 then ends.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present disclosure have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implement method of secure container use, the method comprising:
    generating respective user group permission identifications associated with image layer staging operations permissions assigned to different user groups;
    generating respective user group permission identifications associated with image layer staging operations permissions assigned to different user groups, wherein the image layer staging operations affect a layer prior to executing the layer;
    generating a list of the user group permission identifications;
    responsive to a request from a user to perform an image layer staging operation, verifying whether the user has a user group permission identification in the list of the user group permission identifications;
    responsive to verification that the user has a user group permission identification in the list of the user group permission identifications, executing the requested image layer staging operation; and
    responsive to determination that the user does not have a user group permission identification in the list of the user group permission identifications, denying the requested image layer staging operation.

2. The method of claim 1, wherein the image layer staging operations comprise at least one of:
    pull image;
    run container;
    build image; or
    push image.

3. The method of claim 1, further comprising:
    recording the image layer staging operations permissions assigned to the different user groups; and
    storing respective settings of the image layer staging operation permissions, wherein the image layer staging operations permissions are stored in a layer staging permission table generated with a declaration defined by a user who pushes an image to a repository.

4. The method of claim 1, wherein generating the list of the user group permission identifications is performed by a layer staging permission producer module in a graph driver.

5. The method of claim 1, wherein verifying whether the user has a user group permission identification in the list of the user group permission identifications is performed by a layer staging permission assumer module in a docker daemon engine.

6. The method of claim 1, wherein generating a list of the user group permission identifications further comprises:
    responsive to a determining that there is a user group permission setting on an image layer, reading a layer staging permission setting defined by a user;
    generating a layer staging permission table;
    calculating a layer staging permission identification;
    creating a layer staging permission identification list;
    storing the layer staging permission identification list in metadata of the image layer; and
    pushing an updated image to a repository.

7. The method of claim 1, wherein verifying whether the user has a user group permission identification in the list of the user group permission identifications further comprises:
    receiving the request from the user to perform the image layer staging operation;
    reading metadata of an image layer;
    responsive to a determination there is a layer staging permission identification list, reading an image identification of the image layer;
    constructing an image staging operation code corresponding to the image layer staging operation requested by the user;
    parsing a user group permission assigned to the user regarding layer staging;
    calculating a user group permission identification according to the image identification, image operation code, and user group permission; and searching a layer staging permission identification list for the user group permission identification.

8. A system for secure container use, the system comprising:
a storage device that stores program instructions;
one or more processors operably connected to the storage device and configured to execute the program instructions to cause the system to:
generate respective user group permission identifications associated with image layer staging operations permissions assigned to different user groups, wherein the image layer staging operations affect a layer prior to executing the layer;
generate a list of the user group permission identifications;
responsive to a request from a user to perform an image layer staging operation, verify whether the user has a user group permission identification in the list of the user group permission identifications;
responsive to verification that the user has a user group permission identification in the list of the user group permission identifications, execute the requested image layer staging operation; and
responsive to determination that the user does not have a user group permission identification in the list of the user group permission identifications, deny the requested image layer staging operation.

9. The system of claim 8, wherein the processors further execute instructions to cause the system to:
record the image layer staging operations permissions assigned to the different user groups; and
store respective settings of the image layer staging operation permissions, wherein the image layer staging operations permissions are stored in a layer staging permission table generated with a declaration defined by a user who pushes an image to a repository.

10. The system of claim 8, wherein generating the list of the user group permission identifications is performed by a layer staging permission producer module in a graph driver.

11. The system of claim 8, wherein verifying whether the user has a user group permission identification in the list of the user group permission identifications is performed by a layer staging permission assumer module in a docker daemon engine.

12. The system of claim 8, wherein the instructions that cause the system to generate a list of the user group permission identifications further cause the system to:
responsive to a determining that there is a user group permission setting on an image layer, read a layer staging permission setting defined by a user;
generate a layer staging permission table;
calculate a layer staging permission identification;
create a layer staging permission identification list;
store the layer staging permission identification list in metadata of the image layer; and
push an updated image to a repository.

13. The system of claim 8, wherein the instructions that cause the system to verify whether the user has a user group permission identification in the list of the user group permission identifications further cause the system to:
receive the request from the user to perform the image layer staging operation;
read metadata of an image layer;
responsive to a determination there is a layer staging permission identification list, read an image identification of the image layer;
construct an image staging operation code corresponding to the image layer staging operation requested by the user;
parse a user group permission assigned to the user regarding layer staging;
calculate a user group permission identification according to the image identification, image operation code, and user group permission; and
search a layer staging permission identification list for the user group permission identification.

14. A computer program product for secure container use, the computer program product comprising:
a persistent storage medium having program instructions configured to cause one or more processors to:
generating respective user group permission identifications associated with image layer staging operations permissions assigned to different user groups, wherein the image layer staging operations affect a layer prior to executing the layer;
generate a list of the user group permission identifications;
responsive to a request from a user to perform an image layer staging operation, verify whether the user has a user group permission identification in the list of the user group permission identifications;
responsive to verification that the user has a user group permission identification in the list of the user group permission identifications, execute the requested image layer staging operation; and
responsive to determination that the user does not have a user group permission identification in the list of the user group permission identifications, deny the requested image layer staging operation.

15. The computer program product of claim 14, wherein the image layer staging operations comprise at least one of:
pull image;
run container;
build image; or
push image.

16. The computer program product of claim 14, wherein the instructions are further configured to cause the processors to:
record the image layer staging operations permissions assigned to the different user groups; and
store respective settings of the image layer staging operation permissions, wherein the image layer staging operations permissions are stored in a layer staging permission table generated with a declaration defined by a user who pushes an image to a repository.

17. The computer program product of claim 14, wherein generating the list of the user group permission identifications is performed by a layer staging permission producer module in a graph driver.

18. The computer program product of claim 14, wherein verifying whether the user has a user group permission identification in the list of the user group permission identifications is performed by a layer staging permission assumer module in a docker daemon engine.

19. The computer program product of claim 14, wherein the instructions that cause the processors to generate a list of the user group permission identifications further cause the processors to:
responsive to a determining that there is a user group permission setting on an image layer, read a layer staging permission setting defined by a user;
generate a layer staging permission table;
calculate a layer staging permission identification;

create a layer staging permission identification list;
store the layer staging permission identification list in metadata of the image layer; and
push an updated image to a repository.

20. The computer program product of claim 14, wherein the instructions that cause the processors to verify whether the user has a user group permission identification in the list of the user group permission identifications further cause the processors to:
receive the request from the user to perform the image layer staging operation;
read metadata of an image layer;
responsive to a determination there is a layer staging permission identification list, read an image identification of the image layer;
construct an image staging operation code corresponding to the image layer staging operation requested by the user;
parse a user group permission assigned to the user regarding layer staging;
calculate a user group permission identification according to the image identification, image operation code, and user group permission; and
search a layer staging permission identification list for the user group permission identification.

* * * * *